Jan. 23, 1945.  A. VENDITTY  2,367,812
BRIDGE FOR FASTENER DEVICES
Filed Nov. 29, 1941
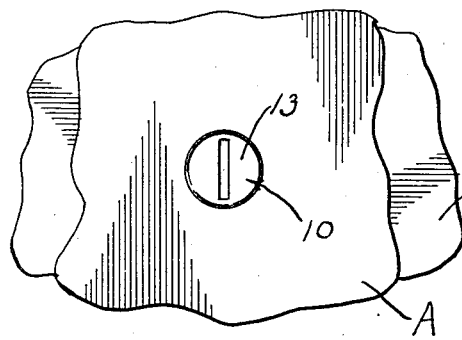
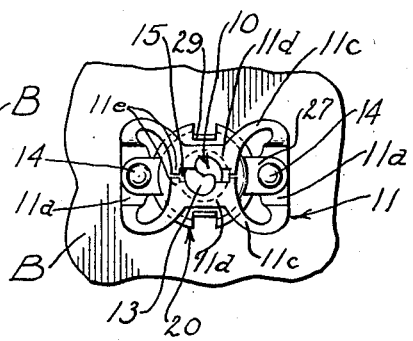
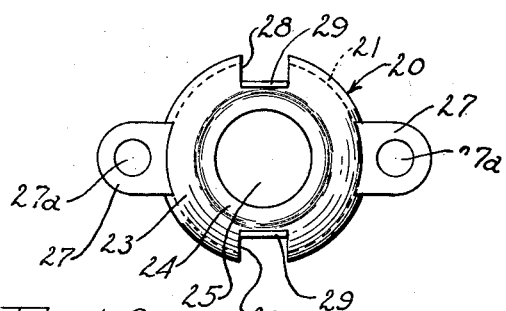
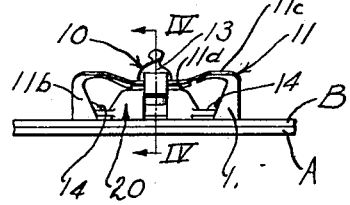
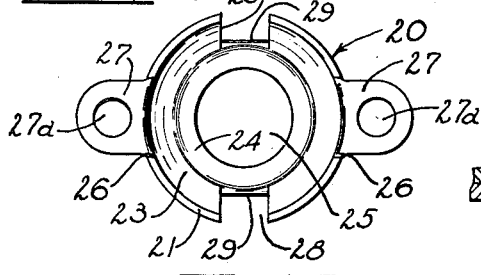
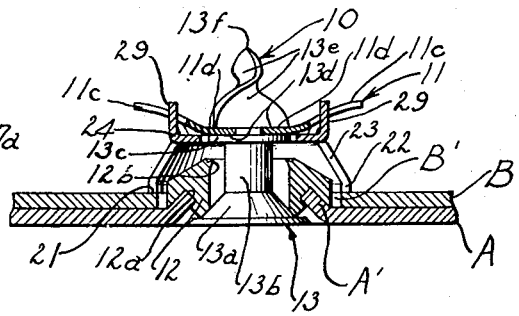
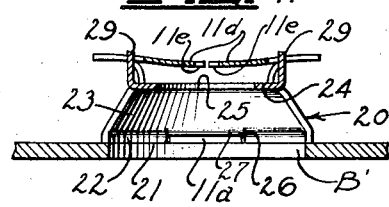
Inventor
ANTHONY VENDITTY Patented Jan. 23, 1945

2,367,812

UNITED STATES PATENT OFFICE 2,367,812

BRIDGE FOR FASTENER DEVICES

Anthony Venditty, Detroit, Mich., assignor to Thompson Products Incorporated, Cleveland, Ohio, a corporation of Ohio Application November 29, 1941, Serial No. 420,972

10 Claims. (Cl. 24—221)

This invention relates to tension load carrying members adapted to be interposed between the spring member of a fastener device and the part to which the spring member is attached, for providing a spring abutment surface enabling the spring to carry heavy tension loads.

More specifically this invention relates to a hollow cup-shaped bridge member for a fastener device including a spring member having a pair of spaced feet for mounting on a part to be fastened to another part and also having upstanding legs supporting bridging spring arms in spaced relation from the feet.

According to this invention the tension load carrying capacity of fastening devices especially adapted for fastening airplane cowling, airplane inspection plates, automotive accessories and the like is increased by interposing a bridge member between a part to be fastened to another part and the spring of the fastening device. The fastening devices especially improved by the bridge member of this invention include a spring member spanning an aperture in a part to be fixed to another part and a locking stud extending through the apertures of both parts having locking instrumentalities engaging the spring to secure the parts together. The aperture-spanning spring member is deflected when tension loads are applied to the fastened together parts and in order to increase the tension load carrying capacity of such fasteners, in accordance with this invention, a bridge member is interposed between the aperture spanning portion of the spring member and the part to which the spring member is fastened. The bridge has one end thereof seated on the spring member carrying part around the aperture of the part and receives the locking stud therethrough. The other end portion of the bridge provides an abutment surface underlying the aperture spanning portion of the spring member so as to engage this spanning portion when the same is deflected under tension load and thereby resist further deflection.

In order to maintain the spring member and bridge member in loosely assembled relation prior to their actual mounting on a part to be fastened to another part the bridge member is provided with laterally extending ears overlying the feet of the spring member. These ears are apertured so as to receive therethrough the same rivets which affix the spring member to the part to be fastened. The bridge member also has upstanding lugs projecting above the abutment surface thereof for straddling the aperture-spanning portion of the spring member. When the ears are placed in overlying relation to the feet of the spring member and between the upstanding legs on these feet and when the lugs straddle the spring arms or spanning portion of the spring, the spring member part and the bridge part are held in assembled relation and will not separate. This facilitates shipment of the parts and decreases installation time.

It is, then, an object of this invention to provide an improved tension load carrying abutment member for fastening devices.

A further object of this invention is to increase the tension load carrying capacity of spring type fasteners.

A specific object of the invention is to provide a bridge member between the spring member of a fastening device and the part on which the spring member is fastened for producing an abutment surface capable of coacting with the spring under heavy loads.

A further object of the invention is to provide a hollow cup-shaped bridge member for spring and locking stud type fasteners to abut the spring of the fastener when the same is deflected under heavy tension load for increasing the spring resistance.

Other and further objects of the invention will become apparent to those skilled in the art from the following description of the annexed sheet of drawings which, by way of a preferred example, illustrates one embodiment of the invention applied to a specific type of fastener device with which it is especially useful.

On the drawing:

Figure 1 is a top plan view of a fastener equipped with a bridge member according to this invention and mounted in position on metal plates.

Figure 2 is a bottom plan view of the fastener device of Figure 1.

Figure 3 is a side elevational view of a fastener equipped with a bridge member according to this invention illustrating the fastener in locked position and holding together the pair of metal plates.

Figure 4 is an enlarged vertical cross-sectional view along the line IV—IV of Figure 3.

Figure 5 is a top plan view of the bridge member according to this invention.

Figure 6 is a bottom plan view of the bridge member according to this invention.

Figure 7 is a cross-sectional view similar to Figure 4 with the outer plate and parts of the fastener elements omitted to more clearly show cooperation between the bridge member and fastener spring.

As shown on the drawing:

In Figures 1 to 4, inclusive, the reference characters A and B designate parts, such as metal sheets or plates to be fastened together by the fastener 10.

As best shown in Figures 2 to 4 the fastener 10 is composed of a spring member 11, grommet 12, and locking stud 13. The plate B is apertured as at B' to receive the grommet 12 freely therethrough while the plate A is embossed or dimpled as at A' and apertured through the bottom of the dimple. The grommet 12 has a recess 12a receiving the embossed rim of the apertured dimple for fixedly retaining the grommet to the plate A.

The spring member 11 is a one-piece member having a pair of feet 11a, 11a on opposite sides of the aperture B' through the plate B. These feet receive rivets 14 therethrough for holding the spring member in fixed relation to the plate B.

Each foot 11a has a pair of upstanding legs 11b thereon supporting bridging arms 11c in spaced relation above the feet 11a. Each bridging arm 11c extends between a pair of legs 11b on one side of the feet 11a and bridges the aperture B' in the metal plate B.

Each arm 11c has a centrally inwardly disposed portion 11d over the aperture B'. These inwardly disposed portions 11d define therebetween a slot 15 adapted to receive locking instrumentalities on the stud 13 as will be hereinafter more fully described.

The ends of each inwardly disposed portion 11d have inwardly projecting ears 11e defining the ends of the slot 15. These ears 11e are maintained in spaced opposed relation as best shown in Figure 2 during the loading and unloading of the spring by the stud 13.

The spring member 11 may be stamped from a flat piece of metal. The arms 11c curve outwardly and inwardly from the portions 11d thereof to merge with the upper ends of the legs 11b. The legs 11b are substantially aligned with the outer edges of the inwardly projecting central portions 11d. The outward and inward curvature of the arms gives increased spring action.

The locking stud 13 as best shown in Figure 4 includes the conical head 13a adapted to fit into the dimple of the embossed plate portion A' and engage the mouth of the grommet 12. A cylindrical shank portion 13b extends from the small end of the head 13a and is adapted to fit freely in the grommet 12.

The shank 13b has an enlarged cylindrical end portion 13c defining a shoulder adapted to abut an inwardly projecting bead 12b formed on the grommet to loosely hold the stud in the grommet. The cylindrical end portion 13c has transverse slots 13d on diametrically opposed sides thereof. The slots are open ended and are disposed normally to the axis of the stud shank.

A pair of helical grooves 13e are cut in the enlarged end 13c of the stud shank and each groove 13e extends from an end of a separate slot 13d for one-quarter turn around the portion 13c to terminate in a common point 13f. The grooves 13e, 13e provide separate diverging cam surfaces from the point 13f to a separate slot 13d.

When the apertured plates A and B are mounted in superimposed relation with the grommet 12 extending through the aperture B' the point 13f of the stud will thrust partially through the slot 15 between the spring arm portions 11d, 11d. A quarter turn rotation of the stud will draw the spring arms toward the plate or stud head while at the same time spreading the arms apart due to the diverging paths afforded by the cam surfaces 13e. Upon completion of the quarter turn rotation of the stud the spring portions 11d will have reached the slots 13d and will snap into the slots with positive spring action to reclaim their original laterally unstressed positions. However, the spring arms will not be released from deflection toward the head of the stud so that the plates A and B will be held together in fastened relation. A reverse rotation of the stud will effect a lateral spreading of the arms out of the slots 13d and will permit withdrawal of the stud from the slot 15 between the arms for separating the plates A and B. The fastener thus locks and unlocks with positive snap action caused by lateral movement of the spring arms into and out of the slots in the stud.

The grommet 12 is adapted to thrust against the aperture defining walls of the aperture B' in the plate B in the event that the plates A and B are subjected to shear loads. However, in the event that the plates A and B are subjected to tension loads tending to separate the plates, the spring arms can be somewhat further deflected unless provision is made for resisting the further deflection.

Therefore, in accordance with this invention a bridge member 20, best shown in Figures 5 and 6, is interposed between the plate B and the spring arm portions 11d, 11d, as best shown in Figures 2 to 4 and 7.

The bridge 20 can be stamped from sheet metal to provide a hollow cup-shaped member with an open mouth at one end and an apertured abutment surface at the other end.

The bridge 20 as best shown in Figures 5 and 6, has the open mouthed end thereof bounded by a circular rim 21. A cylindrical side wall portion 22, as best shown in Figures 4 and 7, extends from the rim 21 and merges with a frusto-conical side wall portion 23 which tapers inwardly to a flat abutment surface 24 apertured as at 25 to freely receive the locking stud therethrough.

The rim 21 has recesses 26 in diametrically opposed portions thereof and ears 27 project laterally outward from the inner ends of the recesses 26. The bottoms of these ears, as best shown in Figure 7, are flush with or above the rim 21. The ears 27 are apertured as at 27a.

The side wall portions 22 and 23 of the bridge member are slotted as at 28 in 90° angular relationship from the ears 27, and lugs 29 are turned up from the tabs formed by the slots 28 in the side walls. These lugs project above the abutment surface 24 of the bridge member.

The lugs 29 are thus formed from portions of the side walls of the bridge member while the ears 27 can be turned outwardly from the rim portion 21 of the bridge member.

The bridge member 20 is mounted in the spring member 11 with the ears 27 thereof overlying the feet 11a of the spring member. The lugs 29 straddle the spring portions 11d. In this relationship the bridge member and spring member are loosely held together and will not separate even though they are not affixed on a mounting plate such as B.

The same rivets 14 used to secure the spring 11 in place can also be used to secure the bridge in position since these rivets can also pass through the apertures 27a in the bridge ears.

As best shown in Figure 4, the rim 21 of the bridge, when mounted in position on the plate B, rests directly on the plate around the aperture B' thereof. The hollow interior of the bridge is large enough to receive the grommet 12.

As best shown in Figure 7, each recess 26 in the rim 21 of the bridge is sufficiently deep to receive a foot 11a of the spring member freely therein so that the bridge will rest entirely on the plate B and not on the spring member.

As also shown in Figure 7, the apertured abutment surface 24 of the bridge backs up the portions 11e of the spring arms so that when the spring arms are further deflected as under heavy tension loads these portions 11e will thrust against the abutment surface 24. As a result, further deflection of the spring arms will be resisted and the spring resistance of the assembly is thus highly increased.

Any loads imparted on the bridge member by the spring will be directly transmitted to the plate B uniformly around the aperture B' thereof.

The aperture 25 in the bridge is adapted to receive the stud portion 13c in spaced relation therefrom as shown in Figure 4. The bridge thus in no way interferes with the operation of the fastener.

The bridge 20 can be readily assembled at the factory in the spring member 11 with the ears overlying the spring feet and with the lugs straddling the spring arms as explained above. Although the bridge member will have relative movement in the spring member, it is obvious that the ears 27 can only move between the legs 11b of the spring member and that the lugs can only move between the portions 11c and 11d of the spring arms. This loose assembly will prevent unauthorized displacement of the parts and will facilitate mounting of the bridge equipped fastener spring in position on a part to be fastened since the rivets 14 need merely be inserted through the registering apertures of the bridge ears and spring feet 11a.

The lugs 29 prevent the user from inadvertently turning the stud through a greater angle than 90° in a given direction and thus prevent damage to the spring which might otherwise occur. Thus the lugs 29 are spaced apart just enough, as shown in Figure 4, so that the spring arm portions 11d can be spread by the cam surfaces of the locking stud as the stud is rotated to draw the arms into the slots 13d. A further rotation of the stud in the same direction, however, tending to unseat the arms out of the other ends of the slots will effect greater spreading of the arms than occurs during movement of the arms to the slots because, as also shown in Figure 4, the diameter of the stud portion 13c is greater than the largest root diameter of the grooves 13e. As a result, the spring arm portions 11d will be spread into abutting engagement with the lugs 29 whenever it is attempted to rotate the stud beyond its locking position. The lugs will then prevent further spreading of the arms and further rotation of the stud is effectively stopped.

The bridge member is inexpensive and can be made by a simple stamping and punching operation.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a fastener assembly for detachably connecting a plurality of superimposed apertured plates including a spring member having feet for attachment to the innermost plate, said spring member having upstanding legs on each foot and spring arms carried by the legs spanning the aperture in the innermost plate in spaced alignment therewith, and a locking stud having a head for thrusting against the outermost plate together with a shank extending through the apertures of the plates and having locking instrumentalities for engaging the spring arms, the improvement of a hollow tension load carrying abutment member receiving the stud shank therethrough and having one end seated on the innermost plate around the aperture thereof and the other end underlying the spring arms to provide an abutment surface therefor resisting further deflection of the arms, ears projecting from the abutment member overlying the spring feet, and lugs on the abutment member projecting beyond the abutment surface thereof to straddle the sides of the spring arms.

2. In a fastener including a spring member having spaced feet, upstanding legs on opposite sides of each foot, and spring arms connecting the legs on the same sides of both feet, the improvement of a cup-shaped member defining an abutment surface underlying the spring arms and having ears projecting from the side walls thereof overlying the feet together with lugs projecting upwardly from the side walls thereof adapted to straddle the sides of the spring arms whereby said ears and lugs will hold the cup-shaped member in assembled relation with the spring member.

3. In a fastener including a spring member having spaced feet, upstanding legs on opposite sides of each foot and spring arms connecting the legs on the same sides of both feet, the improvement of a hollow bridge with a spring arm abutment surface at one end thereof and a rim at the other end thereof adapted to seat on a part to which the spring member is attachable, recesses in said rim receiving the inner ends of the spring feet, ears on the bridge overlying the spring feet, and upstanding lugs on the bridge straddling the spring arms.

4. A tension load carrying bridge for a fastener comprising a cup-shaped member having an apertured end defining an abutment surface and an open mouth with a supporting rim at the other end, ears projecting outwardly from diametrically opposed portions of the rim and lugs projecting from the side wall of the member above the abutment surface thereof.

5. A tension load carrying bridge for fasteners comprising a stamped hollow member having a conical side wall with a cylindrical end portion defining a rim at the large end of the member, recesses on opposite sides of said rim, ears projecting outwardly from the inner ends of the recesses, a flat apertured wall at the small end of the side wall and lugs projecting from the side wall above the apertured flat wall.

6. A member adapted for resisting tension load deflection of spring members in fastener devices which comprises a cup-shaped stamping having an apertured end wall at one end thereof and an open mouth at the other end thereof bounded by a rim, said rim having recesses in opposite sides thereof, and ears projecting laterally from the inner ends of the recesses.

7. In a fastener assembly for detachably connecting a plurality of superimposed apertured plates including a spring member having feet for attachment to the innermost plate, said spring member having upstanding legs on each foot and spring arms carried by the legs spanning the aperture in the innermost plate in spaced alignment therewith, and a locking stud having a head for thrusting against the outermost plate together with a shank extending through the apertures of the plates, said stud having locking instrumentalities for engaging the spring arms to spread the arms apart while drawing the same into locking position, the improvement which comprises a tension load carrying member receiving the stud shank therethrough and having one end seated on the innermost plate around the aperture and the other end underlying the spring arms to provide an abutment surface resisting further deflection of the arms, and lugs on said member projecting beyond the abutment surface to straddle the sides of the spring arms and resist spreading of the arms beyond a desired degree.

8. A fastener device adapted to detachably connect a plurality of apertured parts which comprises a spring member adapted to be fixedly mounted on the innermost part and having spring arms defining a slot therebetween, a locking stud adapted to extend through the parts into said slot, said locking stud having diverging cam surfaces engaging said spring arms to spread the same apart while simultaneously drawing them toward the innermost part, said stud having oppositely disposed grooves therein normal to the axis thereof each communicating with a divergent end of a cam surface to receive the spring arm therefrom and relieve the spreading stresses therein whereby the spring arms will snap into the grooves from their laterally spread position, a spring arm abutment member apertured to freely receive therethrough the cam surface portion of the locking stud and having lugs straddling the spring arms and spaced apart just sufficient to permit the necessary lateral spreading of the spring arms as the same are being drawn into locked position, said abutment means resisting further spreading of the spring arms to prevent rotation of the stud beyond its locked position.

9. In a fastener for apertured members including a retainer carried by one member and having a portion spanning the aperture thereof, and a stud extending through the apertures of the members to engage the retainer and deflect the aperture spanning portion thereof toward the members, the improvement of an abutment device on the retainer-carrying member in engagement with said member substantially completely around the aperture thereof to provide a rigid assembly, said device having an abutment surface underlying the aperture spanning portion of the retainer to resist further deflection of said portion.

10. In a fastener for apertured members including a retainer carried by one member and having a portion spanning the aperture thereof, and a stud extending through the apertures of the members having instrumentalities thereon to spread the spanning portion of the retainer, the improvement of a bridge member disposed about the stud and having abutment means straddling the aperture spanning portion of the retainer to limit the range of spreading movement thereof effected by the stud.

ANTHONY VENDITTY.